United States Patent
Michaelsen

(10) Patent No.: US 6,920,199 B2
(45) Date of Patent: *Jul. 19, 2005

(54) MIRROR ELEMENT FOR THE REFLECTION OF X-RAYS

(75) Inventor: Carsten Michaelsen, Geesthacht (DE)

(73) Assignee: GKSS-Forschungszentrum Geesthacht GmbH, Geesthacht (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/117,069

(22) Filed: Apr. 1, 2002

(65) Prior Publication Data

US 2003/0185341 A1 Oct. 2, 2003

(30) Foreign Application Priority Data

Feb. 20, 2002 (DE) .......................................... 102 07 169

(51) Int. Cl.$^7$ ................................................ G21K 1/06
(52) U.S. Cl. .................................... 378/84; 378/34
(58) Field of Search ............................ 378/35, 84, 85, 378/83, 157, 70, 34

(56) References Cited

U.S. PATENT DOCUMENTS

| | | | | |
|---|---|---|---|---|
| 5,939,201 A | * | 8/1999 | Boire et al. | 359/839 |
| 6,278,764 B1 | * | 8/2001 | Barbee et al. | 378/84 |
| 6,331,710 B1 | * | 12/2001 | Wang et al. | 250/492.2 |
| 6,449,086 B1 | * | 9/2002 | Singh | 359/359 |
| 6,643,353 B2 | * | 11/2003 | Verman et al. | 378/84 |
| 6,763,086 B2 | * | 7/2004 | Platonov | 378/84 |

FOREIGN PATENT DOCUMENTS

DE    WO 0075646 A2 * 12/2000

* cited by examiner

Primary Examiner—Edward J. Glick
Assistant Examiner—Hoon Song
(74) Attorney, Agent, or Firm—Klaus J. Bach

(57) ABSTRACT

A mirror element for the reflection of x-rays, particularly for EUVL exposure systems for the manufacture of semiconductor structures, wherein the x-rays reach the mirrors under a certain incident angle, consists of a substrate with a multilayer structure disposed thereon which multilayer structure comprises at least a first layer of a lanthanum-containing compound and a second layer of a boron-containing compound alternately disposed on the substrate.

5 Claims, 2 Drawing Sheets

MIRROR ELEMENT FOR THE REFLECTION OF X-RAYS

BACKGROUND OF THE INVENTION

The invention relates to a mirror element for the reflection of x-rays particularly in EUVL-exposure systems for the manufacture of semiconductors, wherein the x-rays reach the mirror element under a large incident angle. The mirror element comprises essentially a substrate on which multiple layers of, alternately, metal and non-metal materials are disposed.

Based on statistical estimates semi-conductor structures become smaller every 2–3 years by a factor ½, whereby the density of the transistors on the semiconductor structures are doubled in this time frame. It is therefore envisioned as a target for that industry that in the year 2005 semiconductor structures will become smaller than 100 nm, see for example National Technology Roadmap for Semiconductors in "Soft x-ray and extreme ultraviolet radiation", David Attwood, Cambridge University Press, 1999. In order to be still able to manufacture such small structures by lithographic exposure procedures, visible light is unsuitable as the light source. Instead, for future exposure procedures the use of light of shorter wavelength will be necessary for example, in the form of "Extreme Ultraviolet Radiation (EUV) or soft x-rays. Since the optical properties of materials are highly dependent on the wavelength and those materials which reflect light in the visible range will generally not reflect light in the EUV range or in the range of soft x-rays, conventional reflectors are not suitable for this wavelength range.

Work in the field of EUVL (Extreme Ultra-Violet Lithography) was concentrated in the past 1½ decades essentially on the development of molybdenum/silicon—or molybdenum/beryllium multilayers as reflectors for these purposes, specifically mainly for the wavelength range of 11–13 nm. It has been found theoretically that multilayers of this type should have a very high reflectivity of up to 70% in the wavelength range of 11–13 nm. As a result of large worldwide efforts, these high reflectivities could in fact be achieved in the last 1½ decades in experiments—see David Attwood referred to earlier.

For the wavelengths ranges about 7 $\mu$m, so far, experimentally a reflectivity of maximally only 20% has been achieved which is insufficient for the lithographic processes for the manufacture of semiconductor structures below the 100 nm mark.

For the optical arrangement of EUVL exposure systems, normally typically six reflectors are used. It is in this connection very important that the individual mirrors have a very high reflectivity. If a system includes for example six reflectors with individual reflectivities of 70% the overall optical transmission of the system is $0.7^6$, that is, only 11.8%. With individual reflectivities of the reflectors of 20% the overall system reflectivity would result in a negligible value of 0.0064%.

For the manufacture of highly integrated semi-conductor structures utilizing the EUVL exposure system a plurality of reflectors are used. It is important that the individual reflectors have an extremely high reflectivity.

The multi-layer reflectors with layers of molybdenum/silicon and molybdenum/beryllium as mentioned earlier are considered to have an acceptable reflectivity in the respective wavelengths of 13–11 nm. However, this reflectivity is really insufficient as shown above, since it is a function of the respective wavelengths, and the light source for the EUVL exposure taking into consideration the increasing density of the semiconductor structures has not been selected yet. The best light sources required for such exposure have not yet been selected; they may not be in the wavelength range mentioned.

It is therefore the object of the present invention to provide a mirror element for the reflection of x-rays, which are suitable for even shorter wavelengths than utilized so far and which, with an essentially normal light incident angle, as it is used at least in connection with conventionally employed reflectors with multiple layers of molybdenum/silicone or molybdenum beryllium or, respectively, have a reflectivity of more than 70%. It should be possible to use the techniques and equipment employed for the manufacture of the conventional mirror elements for the manufacture of such highly integrated semiconductor structures. They should be capable of reflecting light in the wavelength range used herefor, particularly a wave length greater than 6.5 nm; and it should still be possible to manufacture them inexpensively.

SUMMARY OF THE INVENTION

A mirror element for the reflection of x-rays, particularly for EUVL exposure systems for the manufacture of semiconductor structures, wherein the x-rays reach the mirrors under a certain incident angle, consists of a substrate with a multi-layer structure disposed thereon which multilayer structure comprises at least a first layer of a lanthanum containing compound and a second layer of a boron containing compound alternately disposed on the substrate.

The mirror element with a multi-layer arrangement according to the invention has been found to have up to 80% reflectivity at a wavelength of about 7 nm. This means that, in an exposure system with six reflectors, an overall reflectivity of 26.2% can be achieved, which is twice the reflectivity of the best systems known so far.

As a result, there are whole new application possibilities for EUVL exposure systems or, respectively, the EUVL-lithography for the manufacture of semiconductor systems with even higher integration than possible so far. The experts in this field had taken for granted does an increase in reflectivity as it has been achieved with the present invention could not possibly be achieved easily.

The use of lanthanum compounds or elemental lanthanum in the construction of multiple layers in EUV reflectors was certainly not obvious. Lanthanum has a low melting point, which may facilitate undesirable diffusions and which lowers the room temperature stability. It is furthermore highly reactive and therefore hard to handle. It is therefore an element, which an expert would normally never consider for use in connection with such multiple layer reflectors. In addition, and this also speaks against the use of lanthanum, in connection with reflectors—the lanthanum has a highly negative mixing enthalpy with most of the second layers of a pair of layers, in this case boron carbide ($B_4C$). According to expert opinion, for that reason alone, lanthanum could never be considered for use in connection with multiple layer x-ray reflectors—see C. Montcalm, P. A. Kearney, J. M. Slaughter, B. T. Sullivan, M. Chaker, H. Pepin and C. M. Falco "Survey of Ti-, B-, and Y-based soft x-ray-extreme ultraviolet multilayer mirrors for the 2- to 12-nm wavelength region", Appl. Opt. 35, pp 5134–5147, 1996.

In a preferred embodiment of the invention a compound, which contains essentially boron (B, is boron carbide ($B_4C$).

Preferably, a plurality of first and second layers provides for a multilayer mirror element, which improves the reflectivity of the mirror element and whereby the mirror element also acts as a monochromator. Such a mirror element reflects only the exactly desired wavelength of the incident x-ray spectrum suitable for the exposure of the wafer and filters out the undesired wavelength range.

It has been found to very reasonable in accordance with the invention to provide a layer pair with a thickness of 3.3 nm, although, typically, the reflectivity of thinner layers is essentially lower than the reflectivity of thicker layers. But tests have shown that the high reflectivity values of more than 80% achieved with thin layers in the ranges as earlier indicated are higher than the reflectivity achieved with thicker layers when the x-ray or light incidence angle is not 90°, which was completely unexpected.

The mirror elements may be planar, but they may also be curved in a concave and/or convex manner depending on the application of the mirror elements, as for example in the EUVL exposure systems referred to earlier.

The invention will be described below in greater detail with reference to the accompanying drawings.

DESCRIPTION OF PREFERRED EMBODIMENTS

Figure 1:
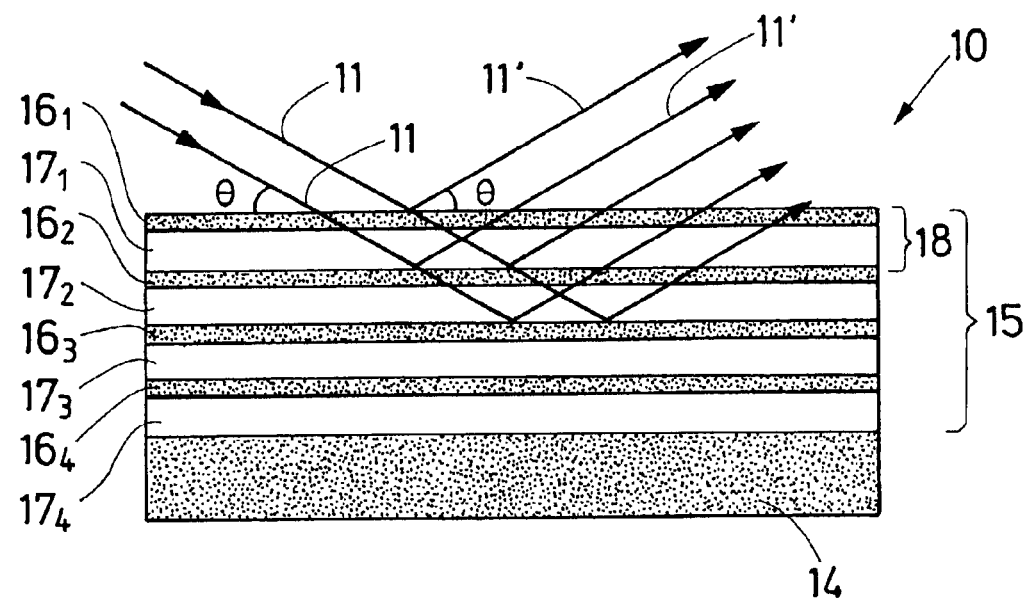
FIG. 1 is a side view showing schematically a mirror element according to the invention.

FIG. 1 shows a mirror element 10 according to the invention, highly enlarged, in a cross-sectional view. In the embodiment shown the mirror element comprises four first layers $16_1$, $16_2$, $16_3$, $16_4$, and four second layers $17_1$, $17_2$, $17_3$, $17_4$. The first layers $16_1$–$16_4$ consist of elemental lanthanum and the second layers $17_1$–$17_4$ consist of boron carbide $B_4C$. Together, the first and second layers from the multi-layer 15 of the mirror element 10. The multilayer 15 is deposited, by known manufacturing methods, on a substrate 14, which may consist for example of quartz glass. The multilayer 15 and the substrate 14 form together the mirror element 10. The thickness 18 of a layer pair comprising a first layer 16 and a second layer 17 is about 3.3 nm. The thicknesses of the first and second layers 16 and 17 may be different as shown in FIG. 1, but they may also be the same. The thickness of the individual layers 16, 17 however may also vary.

Figure 2:
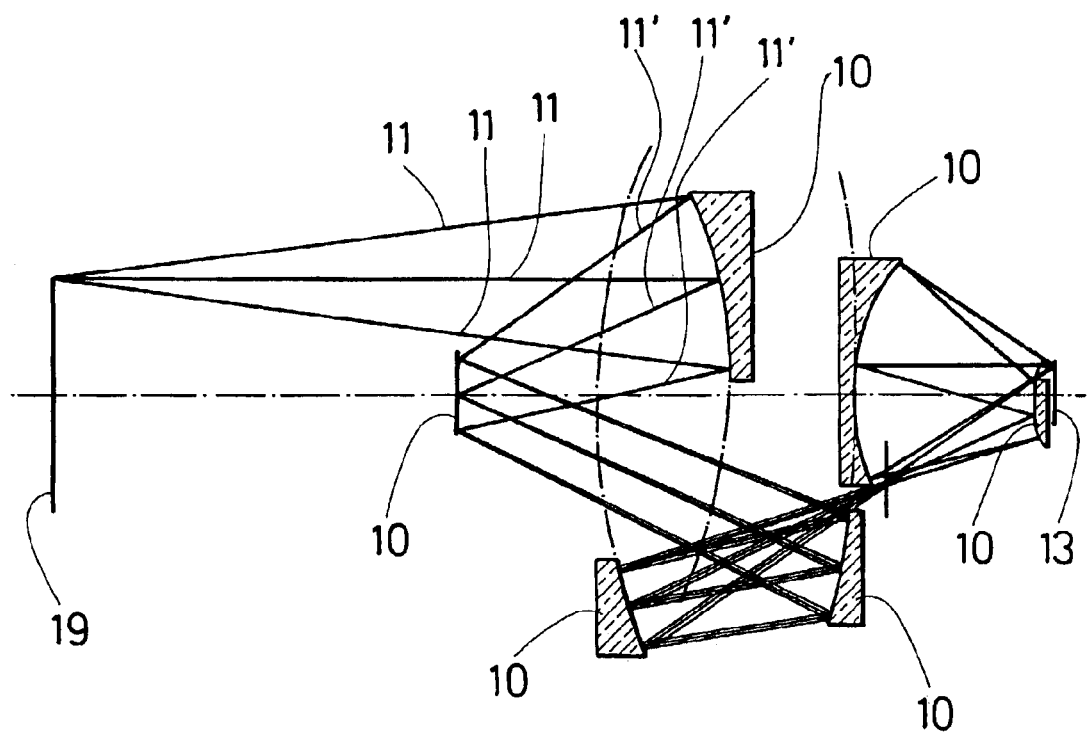
FIG. 2 shows a typical path of rays of a EUVL exposure system for the manufacture of highly integrated semiconductor structures with several mirror elements according to the invention.

As shown in FIG. 1, the incident light or, respectively, the incident x-rays 11 reach the first layers 16 at a relatively flat angle Θ and are reflected on the respective surfaces under the same angle Θ. For a better representation, the angle Θ is shown relatively flat that is relatively small. In the known EUVL exposure systems as they are used for the manufacture of highly integrated semiconductor structures, the angles are in the area of almost 90°—see the schematic representation according to FIG. 2, which shows a typical EUVL exposure system for the manufacture of highly integrated semiconductor structures. In the EUVL exposure systems as represented in FIG. 2 are, for example, six mirror elements 10 shown, which serve in this case as reflectors for light 11 used in an EUVL lithography. The mirror elements 10 are shown in the form of planar, concave, and convex mirror elements 10. The mask 19 with the highly integrated semiconductor structure, which is to be depicted on a substrate 13, is subjected to a light or, respectively, x-ray source which is not shown but which irradiates the mask from the left hand side as shown in FIG. 2. The respective image of the mask is, following the path of the light or x-rays 11, depicted on the semiconductor or wafer 13 after having been reflected from the suitably arranged mirror elements 10. For clearer representation only the light ray or, respectively, x-ray 11, 11' is shown in the beam path of the first mirror element 10. Since mirror techniques as such are well known in the manufacture of highly integrated semiconductor systems by means of the known EUVL exposure systems, it is not necessary to describe the arrangement of such systems in detail. The schematic representation presented in FIG. 2 should be sufficient for a person skilled in the art.

Figure 3:
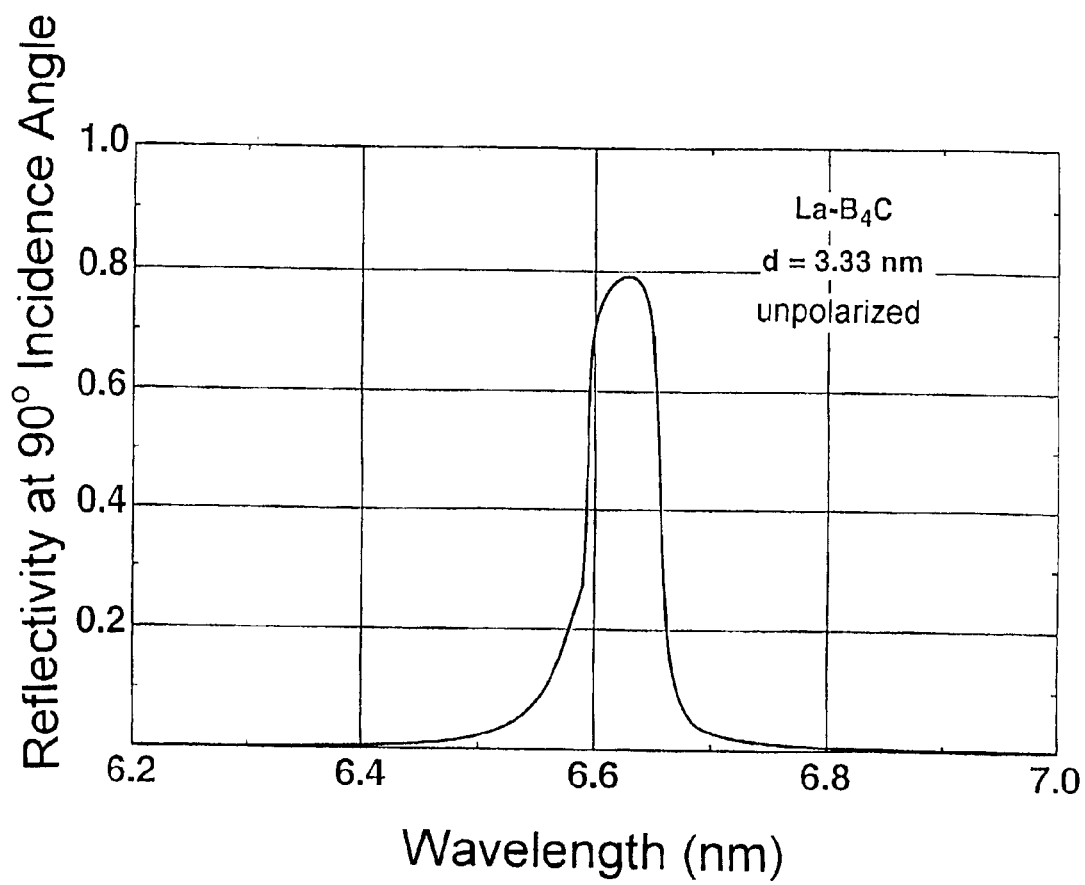
FIG. 3 is a graph showing the reflectivity depending on the wavelength of the radiation at an incidence angle of about 90°.

FIG. 3 shows that the La—$B_4C$ multilayer according to the invention with a thickness of 3.33 nm as provided on the mirror element 10 has a reflectivity of up to 80% at a wavelengths of about 6.64 nm. If boron is used in place of $B_4C$, the reflectivity is even above 80%. For systems with six reflectors therefore a transmission value of 26.2% is achieved which is more than twice the value achievable with the best known reflectors. Tests performed at the German electron synchrotron DESY in Hamburg, where incident light with a wavelength of 7 nm is available, but with which, because of apparatus constraints, a maximum incident angle of 75° could be obtained, have provided very satisfying reflection results, which confirm the theoretically predicted reflectivities for the mirror element according to the present invention. It is pointed out, that, instead of elemental lanthanum (La), a compound consisting essentially of Lanthanum (La) may be used for the first layer 16, or respectively, the first layers $16_{1...n}$. Furthermore, the second layer 17 or, respectively, second layers $17_{1...n}$ may also consist, instead of boron carbide ($B_4C$), of any other suitable boron compound.

What is claimed is:

1. A mirror element for the reflection of x-rays, in Extreme UltraViolet Lithography (EUVL) exposure systems including mirror elements for the manufacture of semiconductor structures, wherein the x-rays reach the mirror elements under a large incident angle of almost 90°, said mirror elements comprising: a substrate with a multilayer structure disposed thereon, said multilayer structure consisting of at least a first layer of a lanthanum containing compound and at least a second layer of a boron containing compound alternately disposed on said substrate.

2. A mirror element according to claim 1, wherein said second layer consists essentially of boron carbide ($B_4C$).

3. A mirror element according to claim 1, wherein a plurality of said first and second layers are alternately disposed on said substrate to form said multilayer.

4. A mirror element according to claim 1, wherein a pair of first and second layers has a thickness of about 3.3 nm.

5. A mirror element according to claim 1, wherein said multilayer structure is curved.

* * * * *